US008947397B2

(12) United States Patent
Fujii

(10) Patent No.: US 8,947,397 B2
(45) Date of Patent: Feb. 3, 2015

(54) ELECTRONIC APPARATUS AND DRAWING METHOD

(71) Applicant: Kabushiki Kaisha Toshiba, Tokyo (JP)

(72) Inventor: Tetsuya Fujii, Fussa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 167 days.

(21) Appl. No.: 13/762,734

(22) Filed: Feb. 8, 2013

(65) Prior Publication Data
US 2014/0118291 A1 May 1, 2014

(30) Foreign Application Priority Data
Oct. 31, 2012 (JP) .................................. 2012-240991

(51) Int. Cl.
G06F 3/045 (2006.01)
G06F 3/041 (2006.01)

(52) U.S. Cl.
CPC .................................... G06F 3/0418 (2013.01)
USPC ......................................................... 345/174

(58) Field of Classification Search
None
See application file for complete search history.

(56) References Cited

U.S. PATENT DOCUMENTS 4,764,885 A * 8/1988 Greanias et al. ............... 345/179
4,945,348 A * 7/1990 Ibamoto et al. ............... 345/104
5,771,039 A * 6/1998 Ditzik .......................... 345/178
5,973,676 A 10/1999 Kawakura
6,778,167 B2 8/2004 Ohashi
2011/0291944 A1* 12/2011 Simmons et al. ............. 345/173

FOREIGN PATENT DOCUMENTS

| JP | 07-073278 A | 3/1995 |
| JP | 07-152475 A | 6/1995 |
| JP | 08-063277 A | 3/1996 |
| JP | 2002-073268 A | 3/2002 |
| JP | 2011-164746 A | 8/2011 |
| JP | 2012-059049 A | 3/2012 |

OTHER PUBLICATIONS

First Office Action mailed by Japan Patent Office on Jun. 4, 2013 in the corresponding Japanese patent application No. 2012-240991.

* cited by examiner

Primary Examiner — Nicholas Lee
(74) Attorney, Agent, or Firm — Knobbe, Martens, Olson & Bear LLP

(57) ABSTRACT

According to one embodiment, an apparatus includes a display detects a position of a first contact in which an area of contact with an object is equal to or smaller than a first threshold value, and a position of a second contact in which an area of contact with an object is equal to or larger than a second threshold value, a corrector corrects the position in which the first contact is sensed, and a drawing module draws at least one of a locus of a position corrected by the correction module, and a locus of the position of the first contact. The corrector corrects the position in which the first contact is sensed, by using at least one of whether the second contact is sensed, and a positional relationship between the first contact and the second contact.

18 Claims, 9 Drawing Sheets

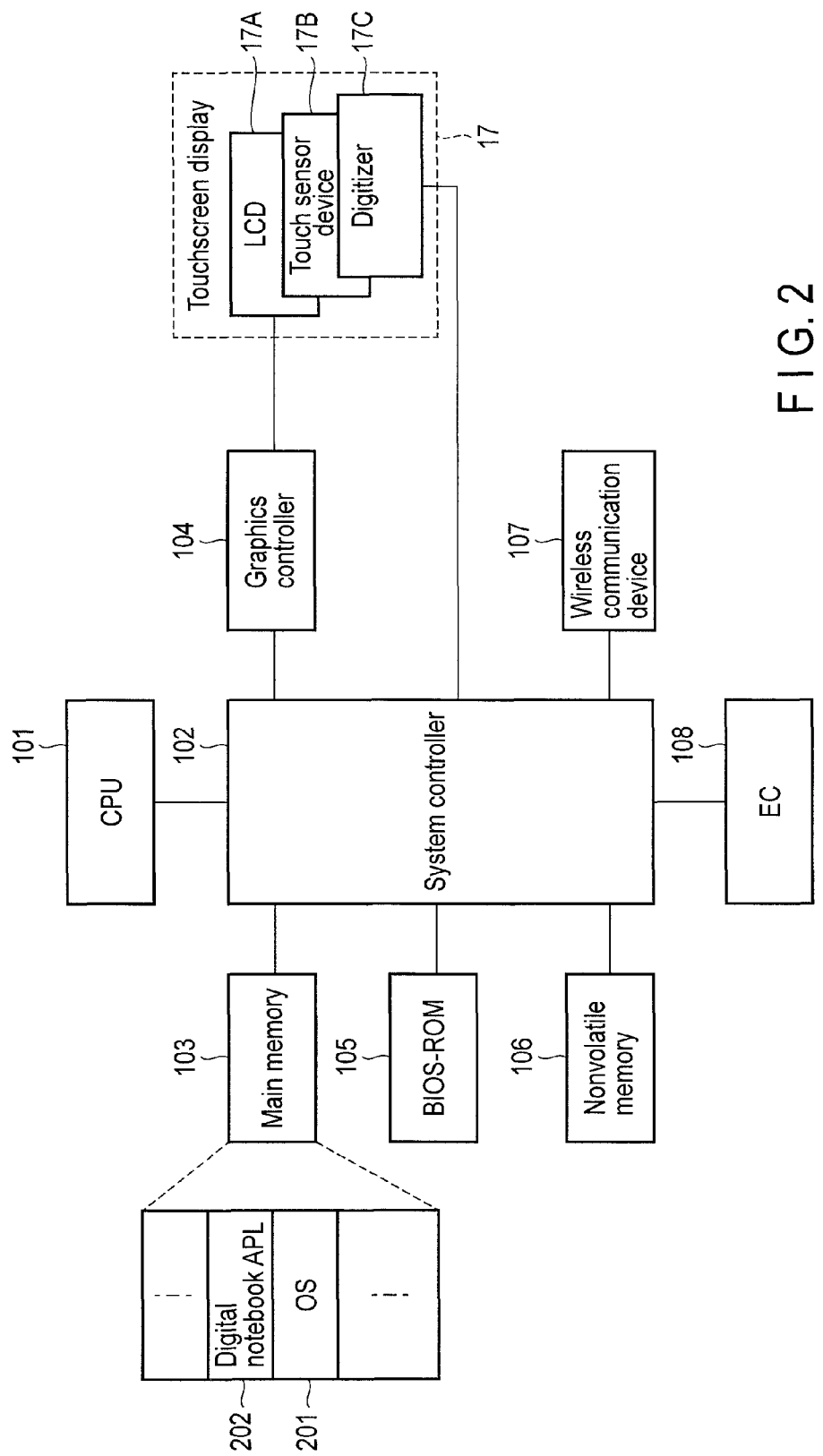
F I G. 2

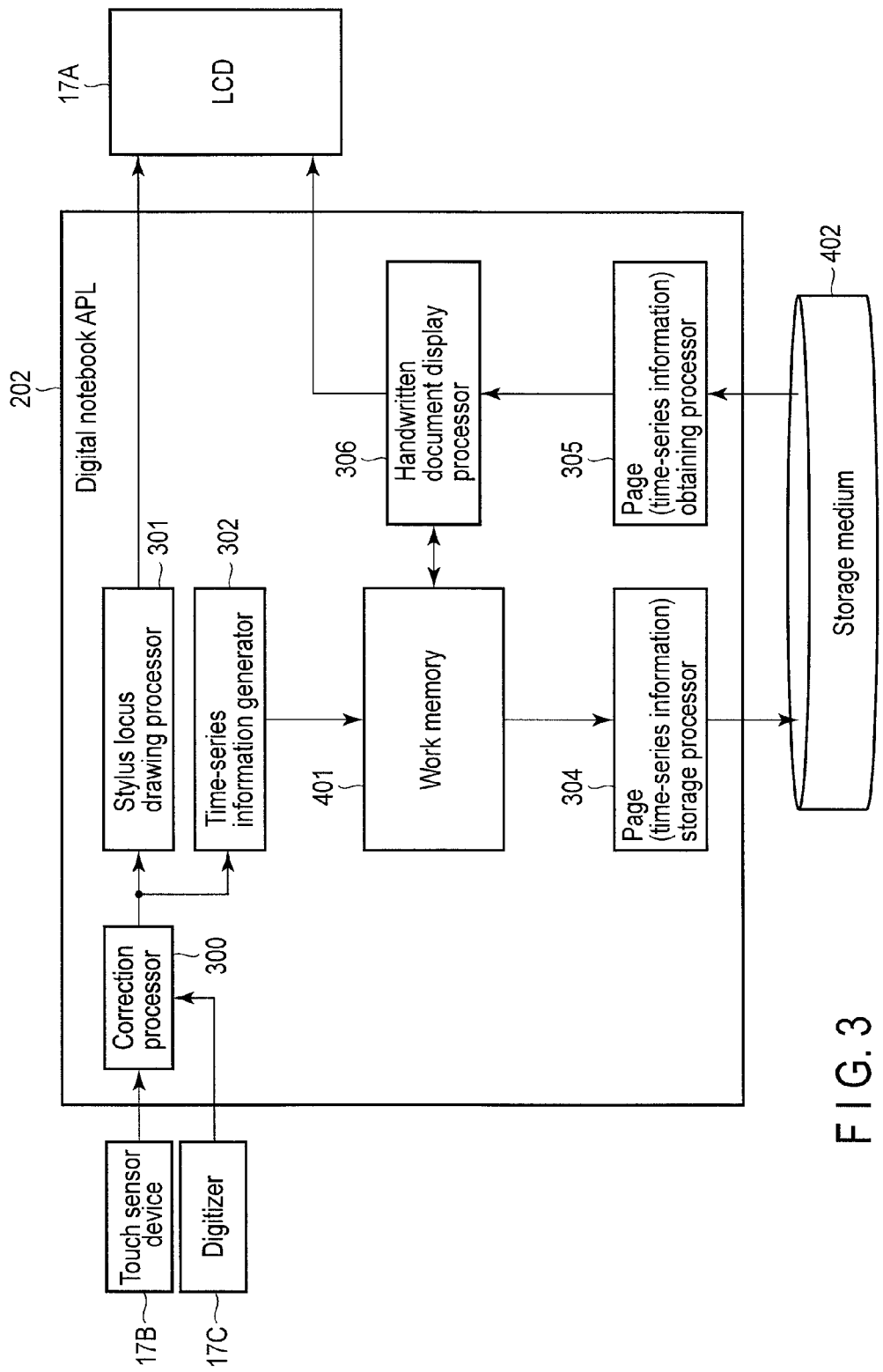
F I G. 3

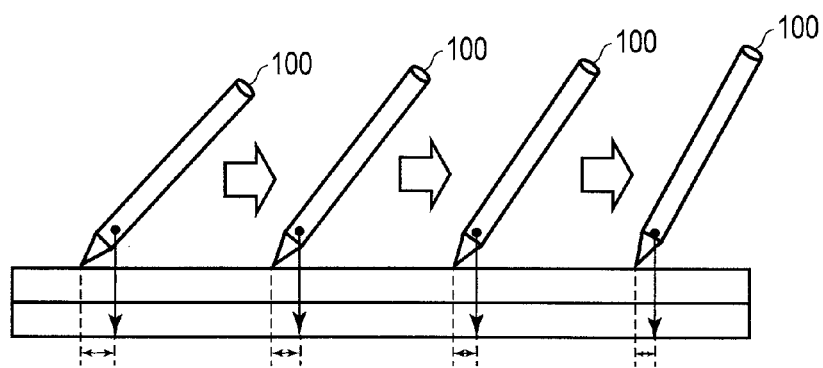
F I G. 7
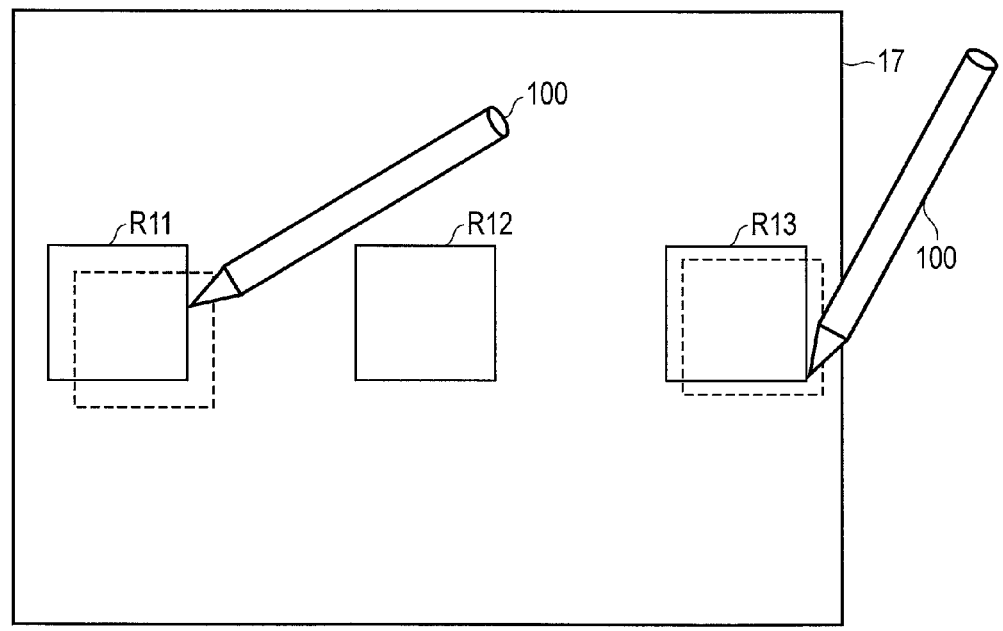
F I G. 8

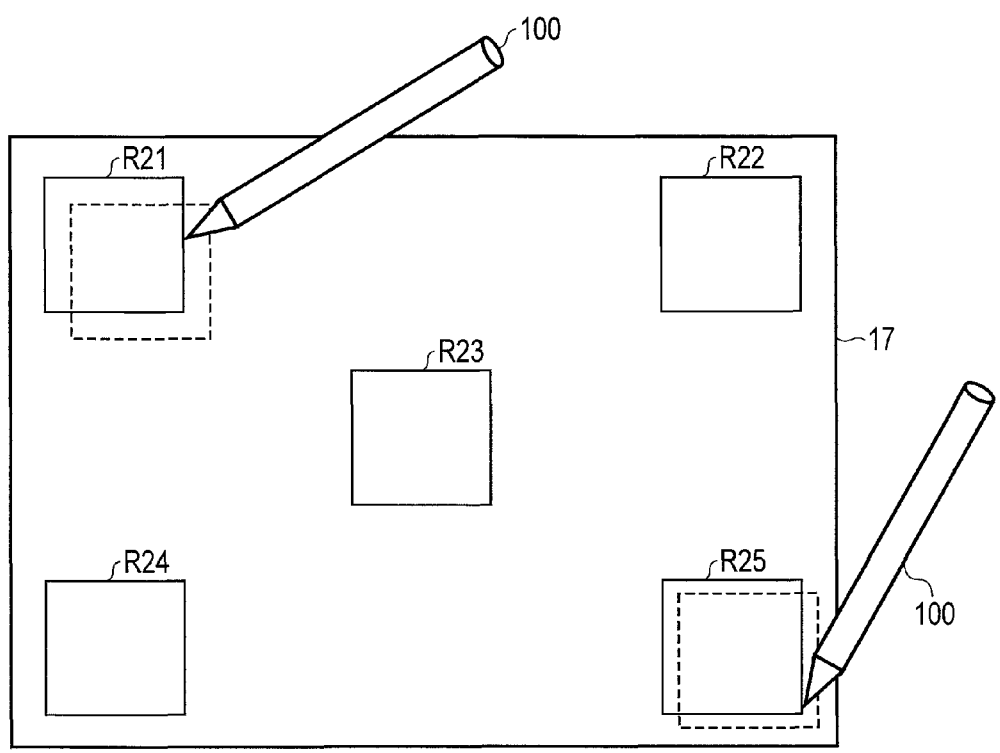
F I G. 9

US 8,947,397 B2

ELECTRONIC APPARATUS AND DRAWING METHOD

CROSS-REFERENCE TO RELATED APPLICATIONS

This application is based upon and claims the benefit of priority from Japanese Patent Application No. 2012-240991, filed Oct. 31, 2012, the entire contents of which are incorporated herein by reference.

FIELD

Embodiments described herein relate generally to stylus input on a screen.

BACKGROUND

Digitizers which use inductive styluses are widely used. The current positional correction (calibration) method is performed by displaying + marks in the four corners of the display screen of the LCD, and requiring the user to tap the center of each + mark. In using the above method, the user often holds the stylus so that it is as perpendicular as possible to the display screen, to accurately put the tip of the stylus on the + mark, and performs operation from immediately above.

In the positional correction performed by using the above method, when the user holds the stylus in an inclined state, the position in which the line is actually displayed is displaced from the position of the line expected by the user, unlike the state in which the user actually writes figures or characters. Therefore, the user feels that it is difficult to draw figures and characters.

In the prior art, there are cases where the position in which the line is actually displayed is displaced from the position of the line expected by the user, and the user feels that it is difficult to draw figures and characters.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram illustrating a system configuration of the electronic apparatus of the embodiment.

FIG. 3 is an exemplary block diagram illustrating a functional configuration of a digital notebook application program.

FIG. 7 is an exemplary schematic diagram for explaining the inclination of the stylus.

FIG. 8 is an exemplary diagram illustrating figures for calibration.

FIG. 9 is an exemplary diagram illustrating figures for calibration.

DETAILED DESCRIPTION

Figure 1:
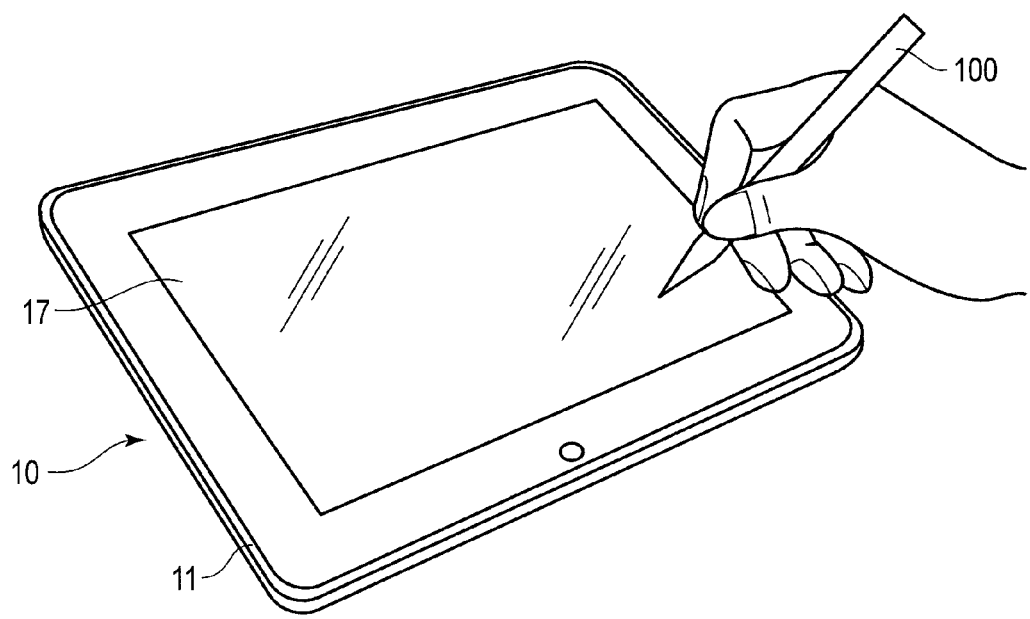
FIG. 1 is a perspective view of an external appearance of an electronic apparatus according to an embodiment.

Various embodiments will be described hereinafter with reference to the accompanying drawings.

In general, according to one embodiment, an electronic apparatus comprises a display, a corrector, and a drawing module. The display is configure to be able to detect a position of a first contact in which an area of contact with an object is equal to or smaller than a first threshold value, and a position of a second contact in which an area of contact with an object is equal to or larger than a second threshold value, the second threshold value being equal to or larger than the first threshold value. The corrector is configured to correct the position in which the first contact is sensed. The drawing module is configured to draw at least one of a locus of a position corrected by the correction module, and a locus of the position of the first contact. The corrector is configured to correct the position in which the first contact is sensed, by using at least one of whether the second contact is sensed, and a positional relationship between the first contact and the second contact.

FIG. 1 is a perspective view of an external appearance of a tablet computer 10 according to an embodiment. The tablet computer 10 is a portable electronic apparatus which is called tablet or slate computer, and comprises a main body 11 and a touchscreen display 17, as illustrated in FIG. 1. The touchscreen display 17 is attached to the main body 11 such that the touchscreen display 17 is superposed on an upper surface of the main body 11.

The main body 11 includes a housing which has a thin box shape. The touchscreen display 17 includes a flat panel display, and a sensor which is configured to sense a position on a screen of the flat panel display, which a stylus or a finger touches. The flat panel display may be, for example, a liquid crystal display device (LCD). For example, a capacitive touch sensor device or an inductive digitizer can be used as the sensor. In the following example, it is supposed that both the two sensors, that are a digitizer and a touch sensor device, are incorporated in the touchscreen display 17. Any sensor may be used as the sensor which corresponds to the digitizer, as long as it can sense contact between the stylus and the touchscreen display 17. The sensor which corresponds to the digitizer can sense a position of a first contact in which an area of contact with an object is equal to or smaller than a first threshold value. Any sensor may be used as the sensor which corresponds to the touch sensor device, as long as it can sense contact between an object (such as a human hand or finger) and the touchscreen display 17. The sensor which corresponds to the touch sensor device can sense a position of a second contact in which an area of contact with an object is equal to or larger than a second threshold value, which is equal to or larger than the first threshold value. For example, in the case where multi-touch can be sensed in the capacitive method, when touches in a plurality of adjacent points are sensed, the detected points can be sensed as second contact positions.

Each of the digitizer and the touch sensor device is provided to cover the screen of the flat panel display. The touchscreen display 17 can sense not only touch operation on the screen using a finger, but also touch operation on the screen using a stylus 100. The stylus 100 may be, for example, an inductive stylus. The user can perform handwriting input operation on the touchscreen display 17, by using an external object (stylus 100 or finger). During handwriting input operation, loci of movement of the external object (stylus 100 or finger) on the screen, that is, loci (handwriting) of strokes handwritten by handwriting input operations are drawn in real time, and thereby a locus of each stroke is displayed on the screen. A locus of movement of the external object while the external object is in contact with the screen corresponds to a stroke. A group of many strokes which correspond to handwritten characters or figures, that is, a group of many loci (handwriting) form a handwritten document.

In the present embodiment, the handwritten document is stored in a storage medium, as time-series information which indicates coordinate string of loci of respective strokes and the order relationship between the strokes, not image data. The time-series information generally means a group of time-series stroke data items which correspond to respective strokes. Each stroke data item corresponds to a stroke, and includes a series of coordinate data (time-series coordinates) which correspond to points on the locus of the stroke. The order of arrangement of these stroke data items corresponds to the order of handwriting of the strokes, that is, the stroke order.

The tablet computer 10 can read desired existing time-series information from the storage medium, and display a handwritten document which corresponds to the time-series information, that is, loci which correspond to respective strokes indicated by the time-series information. The tablet computer 10 also has an edit function. The edit function enables the user to delete or move a desired stroke or a desired handwritten character in the displayed handwritten document, in response to edit operation performed by the user with an "eraser" tool, a range-designating tool, or other various tools. In addition, the edit function also includes a function of canceling history of some handwriting operations.

In the present embodiment, the time-series information (handwritten document) can be managed as one page or a plurality of pages. In this case, the time-series information (handwritten document) may be divided into areas, each of which falls within one screen, and thereby a mass of time-series information which falls within one screen may be stored as one page. As another example, the size of the page may be variable. In this case, the size of the page can be increased to an area which is larger than the screen size, and thus a handwritten document of an area larger than the screen size can be dealt with as one page. When the whole one page cannot be simultaneously displayed on the display, the page may be reduced, or the displayed part of the page may be changed by vertically scrolling the page.

FIG. 2 is a diagram illustrating a system configuration of the tablet computer 10.

As illustrated in FIG. 2, the tablet computer 10 comprises a CPU 101, a system controller 102, a main memory 103, a graphics controller 104, a BIOS-ROM 105, a nonvolatile memory 106, a wireless communication device 107, and an embedded controller (EC) 108.

The CPU 101 is a processor which controls operation of the modules in the tablet computer 10. The CPU 101 executes various software items loaded from the nonvolatile memory 106, which is a storage device, into the main memory 103. The software items include an operating system (OS) 201, and various application programs. The application programs include a digital notebook application program 202. The digital notebook application program 202 has a function of preparing and displaying the above handwritten document, a function of editing the handwritten document, and a character/figure recognition function.

The CPU 101 also executes a basic input/output system (BIOS) which is stored in the BIOS-ROM 105. The BIOS is a program for hardware control.

The system controller 102 is a device which connects a local bus of the CPU 101 with various components. The system controller 102 also includes a memory controller which controls access to the main memory 103. The system controller 102 also has a function of executing communication with the graphics controller 104 through a serial bus of the PCI EXPRESS standard.

The graphics controller 104 is a display controller which controls an LCD 17A that is used as a display monitor of the tablet computer 10. A display signal which is generated by the graphics controller 104 is transmitted to the LCD 17A. The LCD 17A displays a picture image based on the display signal. A touch sensor device 17B and a digitizer 17C are arranged on the LCD 17A. The touch sensor device 17B is a capacitive pointing device configured to perform input on the screen of the LCD 17A. The touch sensor device 17B detects a touch position on the screen, which the finger touches, and movement of the touch position. The touch sensor device 17B outputs coordinate which indicate the touch position on the screen. The digitizer 17C is an inductive pointing device configured to perform input on the screen of the LCD 17A. The digitizer 17C detects the position (coordinate) of the stylus 100 on the screen, which the stylus 100 touches, and movement of the position of the stylus 100. The digitizer 17C outputs coordinate which indicates the position of the stylus 100 on the screen.

The wireless communication device 107 is a device configured to execute wireless communication such as wireless LAN and 3G mobile communication. The EC 108 is a one-chip microcomputer which includes an embedded controller for electric power control. The EC 108 has a function of turning on and off the tablet computer 10, in response to operation of the power button by the user.

Next, a functional configuration of the digital notebook application program 202 will be explained hereinafter with reference to FIG. 3.

The digital notebook application program 202 includes a correction processor 300, a stylus locus drawing processor 301, a time-series information generator 302, a page storage processor 304, a page obtaining processor 305, and a handwritten document display processor 306.

The digital notebook application program 202 prepares, displays, and edits a handwritten document, by using stroke data items which are inputted by using the touchscreen display 17. The touchscreen display 17 is configured to detect generation of events such as "touch", "slide", and "release". The event "touch" is an event which indicates that an external object touches the screen. The event "slide" is an event which indicates that the touch position is moved while the external object is in contact with the screen. The event "release" is an event which indicates that the external object is released from the screen.

The correction processor 300 corrects the coordinate outputted from the digitizer 17C, based on the coordinate outputted from the touch sensor device 17B and the coordinate outputted from the digitizer 17C. The correction processor 300 outputs the corrected coordinate to the stylus locus drawing processor 301 and the time-series information generator 302. The correction processing performed by the correction processor 300 will be described later.

The stylus locus drawing processor 301 and the time-series information generator 302 receive an event "touch" or "slide"

generated by the touchscreen display 17, and thereby detect handwriting input operation. The event "touch" includes coordinate of the touch position. The event "slide" also includes coordinates of the touch position after the stylus is slid. Therefore, the stylus locus drawing processor 301 and the time-series information generator 302 can receive coordinate string, which correspond to loci of movement of the stylus, from the correction processor 300.

The stylus locus drawing processor 301 receives coordinate string from the correction processor 300, and displays loci of respective strokes which are handwritten by handwriting input operation with the stylus 100 or the like, on the screen of the LCD 17A in the touchscreen display 17, based on the coordinate string. The loci of the stylus 100, which are obtained while the stylus 100 is in contact with the screen, that is, loci of respective strokes are drawn on the screen of the LCD 17a by the stylus locus drawing processor 301.

The time-series information generator 302 receives the above coordinate string outputted from the correction processor 300, and generates the above time-series information based on the coordinate string. In this case, the time-series information, that is, coordinates which correspond to respective points of each stroke and time-stamp information may be temporarily stored in a work memory 401.

The page storage processor 304 stores the generated time-series information as a handwritten document (handwritten page) in a storage medium 402. The storage medium 402 may be any one of a storage device in the tablet computer 10, a storage device in the tablet computer 10, and a storage device of a server, as described above.

The page obtaining processor 305 reads desired time-series information, which has already been stored in the storage medium 402, from the storage medium 402. The read time-series information is transmitted to the handwritten document display processor 306. The handwritten document display processor 306 analyzes the time-series information, and displays loci of strokes, which are indicated by the time-series information, on the screen as a handwritten document, based on a result of the analysis.

Next, the cause of parallax generated between the position of the tip of the stylus, which is expected by the user before one's eye, and the actual position.

Figure 4:
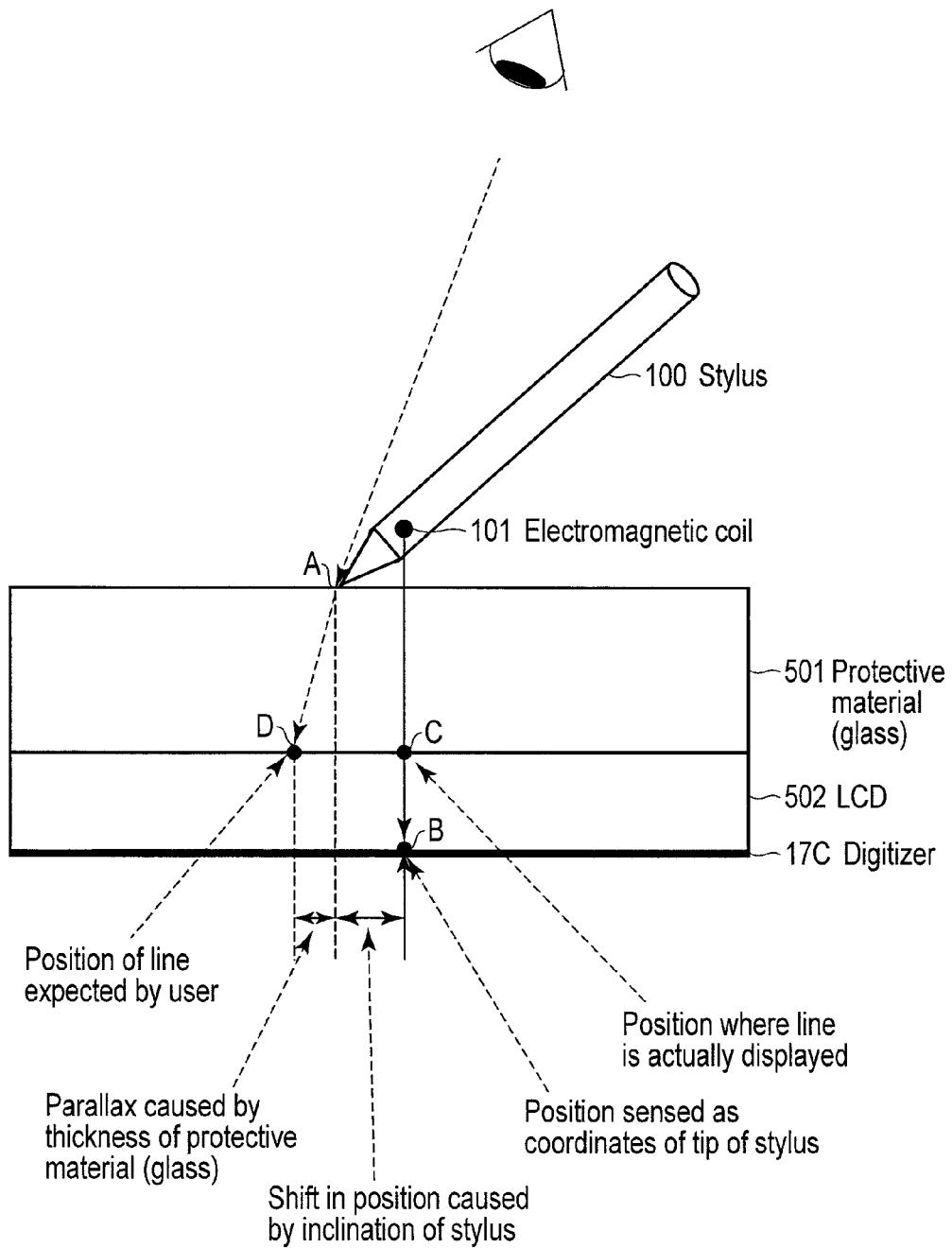
FIG. 4 is an exemplary schematic diagram for explaining parallax.

FIG. 4 is a schematic diagram for explaining parallax. When the stylus 100 is operated at an angle as illustrated in FIG. 4 and input operation is performed at point A on the input screen, electromagnetic waves are generated from an electromagnetic coil 100A, and received at point B on the sensor surface of the digitizer 17C. Since the electromagnetic waves have been received at point B on the digitizer 17C, data is displayed at point C, which is perpendicularly above the point B, on the input screen by the LCD 502.

In addition, in the inductive system, the position of the sensor surface of the digitizer, which is closest to the electromagnetic coil 100A included in the electronic stylus, is recognized as coordinate of the tip of the stylus. Therefore, the position recognized as coordinate of the tip of the stylus is displaced from the actual position of the tip of the stylus, and the displacement increases as the stylus is inclined more.

Besides, since a protective material (glass or the like) 501 exists on the surface of the LCD 502 to protect the LCD 502, parallax occurs between the position of the line which is actually displayed on the LCD 502 and the position of the tip of the stylus which is expected by the user before the eyes.

Figure 5:
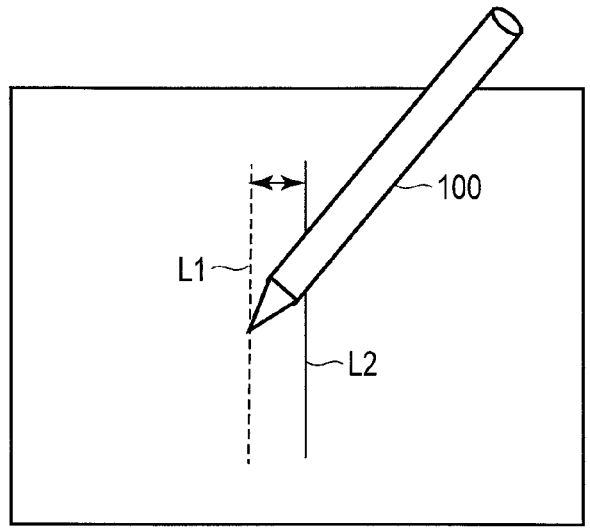
FIG. 5 is an exemplary schematic diagram for explaining displacement.

Therefore, due to parallax caused by the thickness of the protective material 501 and displacement caused by the inclination of the stylus 100 illustrated in FIG. 4, displacement is caused between the position of line L1 expected by the user and the position of line L2 which is actually displayed, as illustrated in FIG. 5.

Next, correction processing performed by the correction processor will be explained hereinafter.

Figure 6:
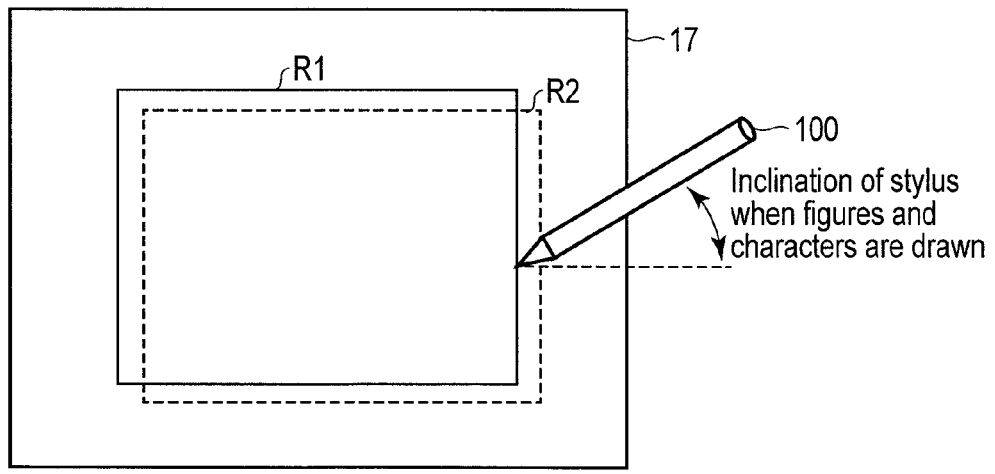
FIG. 6 is an exemplary diagram illustrating a figure for calibration.

To reduce the displacement, the correction processor 300 displays a calibration figure (rectangle R1), which is formed of a plurality of lines, on the screen as illustrated in FIG. 6. The correction processor 300 causes the user to trace the figure by the stylus, and thereby obtains the degree of displacement between the line R2 expected by the user and the coordinates sensed as the position of the tip of the stylus. During this processing, the correction processor 300 obtains the position of the hand which is placed on the screen from the touch sensor device 17B. Then, the correction processor 300 performs positional correction (calibration) by using the degree of displacement and the relationship between the position sensed by the digitizer 17C and the position of the hand, and thereby performs positional correction in consideration of the angle of the eyes and the inclination of the stylus.

The angle of the eyes and the inclination of the stylus differ according to the user, and the way of holding the stylus is different between right-handed people and left-handed people. According to the present method, however, it is possible to perform positional correction with a natural angle of the eyes and inclination of the stylus, which are adopted when the user draws figures and characters, and it is possible to perform positional correction in line with each user's habit performed when the user draws something by the stylus.

In addition, as illustrated in FIG. 7, the stylus 100 tends to be more inclined in a position which is more distant from the user's dominant arm, and tends to be perpendicular in a position which is closer to the user's dominant arm. FIG. 7 illustrates the case where the stylus 100 is held by the user's right hand.

Therefore, as illustrated in FIG. 8 and FIG. 9, calibration figures are displayed in a plurality of places on the screen, and the degree of displacement is obtained in each place. Then, the correction value is adjusted for each place by using those values, and thereby more accurate positional correction can be performed.

The correction processor 300 obtains the degree of displacement, the position of the hand, and the position of the stylus in a place of each figure, and changes the correction quantity according to the place. Since the same user has different inclinations of the stylus and different angles of the eyes according to the place on which the stylus is put, changing the correction quantity according to the place solves the problem of difference in the degree of displacement according to the drawing place, and more accurate positional correction can be performed.

FIG. 8 illustrates an example in which three rectangles R11 to R13 are displayed as calibration figures. The rectangles R11 to R13 are arranged in a horizontal line in the vertical center part of the screen.

FIG. 9 illustrates an example in which five rectangles R21 to R25 are displayed as calibration figures. The rectangle R21 is displayed in an upper left corner of the touchscreen display 17. The rectangle R22 is displayed in an upper right corner of the touchscreen display 17. The rectangle R23 is displayed in the center of the touchscreen display 17. The rectangle R24 is displayed in a lower left corner of the touchscreen display 17. The rectangle R25 is displayed in a lower right corner of the touchscreen display 17.

Figure 10:
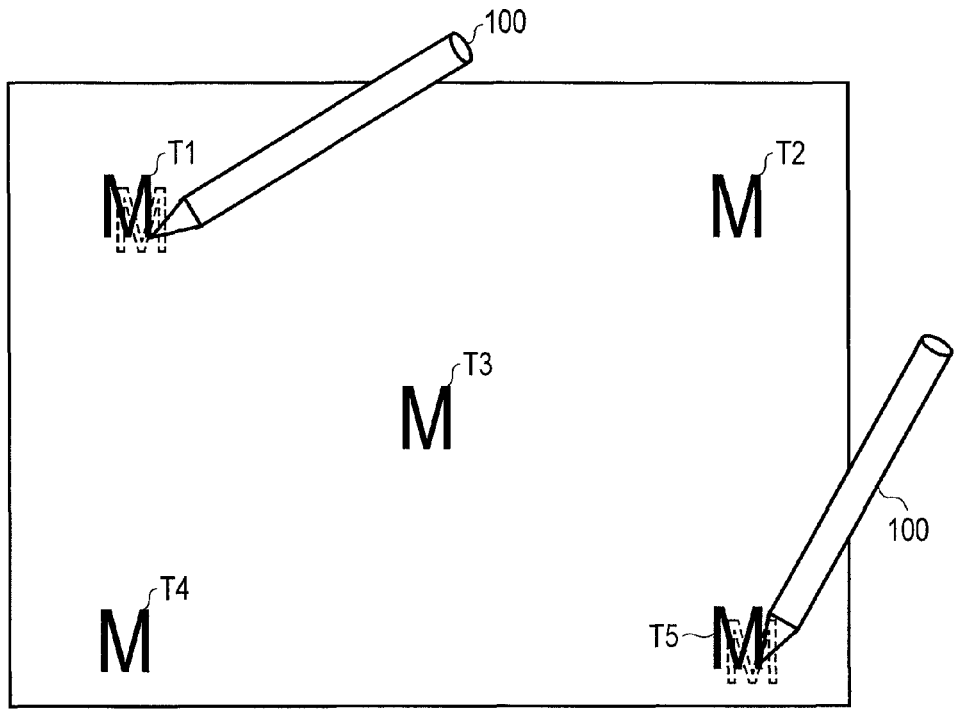
FIG. 10 is an exemplary diagram illustrating figures for calibration.

As illustrated in FIG. 10, characters may be used as the calibration figures, instead of figures. FIG. 10 illustrates an example in which five characters T1 to T5 are displayed as calibration figures. The character T1 is displayed in an upper left corner of the touchscreen display 17. The character T2 is displayed in an upper right corner of the touchscreen display 17. The character T3 is displayed in the center of the touchscreen display 17. The character T4 is displayed in a lower left corner of the touchscreen display 17. The character T5 is displayed in a lower right corner of the touchscreen display 17.

Figure 11:
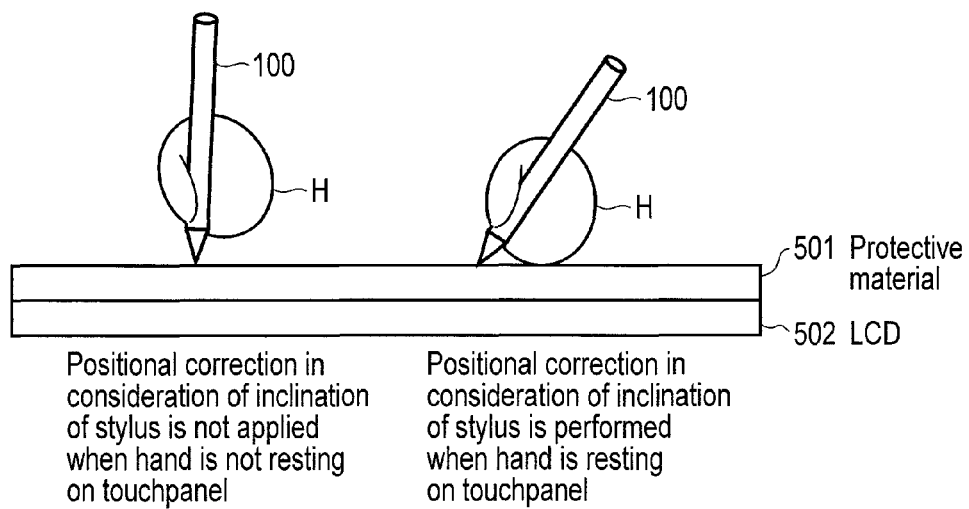
FIG. 11 is an exemplary diagram illustrating the case where the hand which is holding the stylus touches the screen, and the case where the hand which is holding the stylus does not touch the screen.

As illustrated in FIG. 11, the correction processor 300 may perform positional correction only when the hand H which is holding the stylus is resting on the screen. Specifically, when the hand H which is holding the stylus is not resting on the screen, the correction processor 300 outputs the coordinate outputted from the digitizer 17C to the stylus locus drawing processor 301, without performing positional correction. The stylus locus drawing processor 301 draws loci based on the coordinate outputted from the digitizer 17C.

In the case where the stylus is used in an almost perpendicular state, such as the case of tapping a button or menu by the stylus, the positional correction performed on the assumption that the stylus is inclined causes greater displacement. The problem is solved by performing no correction when the hand H which is holding the stylus is not resting on the screen.

The position of the stylus corresponds to the position of the first contact. The position of the hand corresponds to the position of the second contact. The drawing processor 301 corrects the position of the stylus, according to at least one of whether the position of the hand is sensed or not, and the positional relationship between the stylus and the hand. The term "positional relationship between the stylus and the hand" means, for example, a distance between the stylus and the hand. Correction may be performed in the case where the hand H which is holding the stylus is not resting on the screen. A first correction quantity which is used for correcting the position of the stylus by the drawing processor 301 in the case where the hand is not sensed is smaller than a second correction quantity which is used for correcting the position of the stylus by the drawing processor 301 in the case where the hand is sensed.

Figure 12:
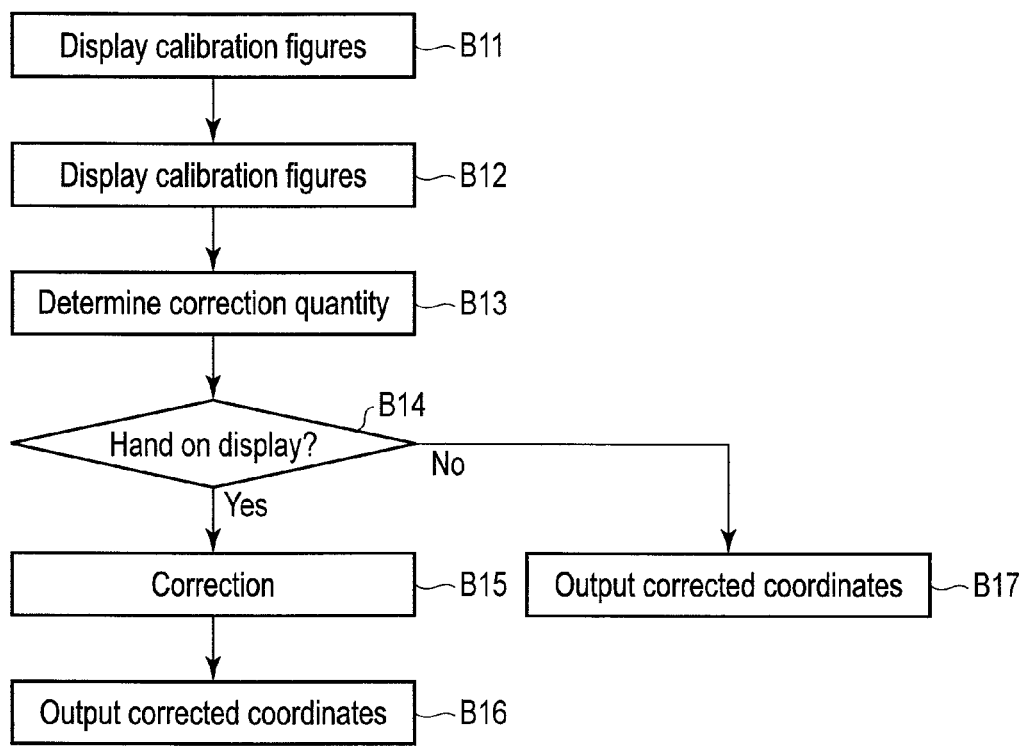
FIG. 12 is an exemplary diagram illustrating a process of processing performed by a correction processor.

Next, a process of processing performed by the correction processor 300 will be explained hereinafter with reference to a flowchart of FIG. 12.

The correction processor 300 displays calibration figures on the screen (Block B11). The correction processor 300 determines a correction quantity in accordance with the position of the stylus and the position of the hand, based on the degree of displacement between the displayed position and the sensed position of the stylus and the position of the stylus and the position of the hand (Block B12).

The correction processor 300 determines whether the hand is placed on the touchscreen display 17, based on a sensing signal of the touch sensor device 17B (Block B13). When the correction processor 300 determines that the hand is placed (Yes of Block B13), the correction processor 300 corrects the coordinate outputted from the digitizer 17C, in accordance with the position of the stylus and the position of the hand (Block B14). The correction processor 300 outputs the corrected coordinate to the stylus locus drawing processor 301 (Block B15). The stylus locus drawing processor 301 performs processing of drawing loci of the coordinate outputted from the correction processor 300.

When the correction processor 300 determines that the hand is not placed (No of Block B13), the correction processor 300 outputs the coordinate which are outputted from the digitizer 17C to the stylus locus drawing processor 301, without performing correction for the coordinate outputted from the digitizer 17C (Block B16). The stylus locus drawing processor 301 performs processing of drawing loci of the coordinates outputted from the correction processor 300.

According to the present embodiment, the coordinate outputted from the digitizer 17C are corrected in accordance with the position of the hand and the position of the stylus, and thereby it is possible to perform positional correction in accordance with the inclination of the stylus which is adopted when the figures are actually drawn, and perform positional correction in accordance with the way (inclination) of holding the stylus for each user.

In addition, according to the present embodiment, the coordinate outputted from the digitizer 17C is not corrected when the touch sensor device 17B does not sense contact of the hand (object), and thereby it is possible to solve the problem that positional correction on the assumption that the stylus is inclined causes greater displacement, in the case where the stylus is used in an almost perpendicular state, such as tapping a button or menu by the stylus.

It suffices that the correction processor 300 performs at least one of correcting the coordinate outputted from the digitizer 17C in accordance with the position of the hand and the position of the stylus, and not correcting the coordinate outputted from the digitizer 17C in the case where the touch sensor device 17B does not sense contact of the hand (object).

Since the drawing processing of the present embodiment can be realized by a computer program, the same effect as that of the present embodiment can easily be achieved, only by installing the computer program in an ordinary computer through a computer-readable storage medium which stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display configured to be able to detect a position of a first contact and a position of a second contact, wherein an area of the first contact is smaller than a first threshold value, an area of the second contact is larger than a second threshold value, and the second threshold value is larger than the first threshold value;
a processor configured to correct a first position of the first contact and to generate a second position of the first contact, information of the first position of the first contact input via the display; and
a drawing controller configured to draw a locus of a second position of the first contact on the display,
wherein the processor is configured to correct the first position of the first contact, by using at least one of whether the second contact is detected or not, and a positional relationship between the first contact and the second contact.

2. The apparatus of claim 1, wherein
the processor is configured to determine a correction quantity of the first position, by using a distance between the first position and the second position.

3. The apparatus of claim 1, wherein
a first correction quantity, which is used by the processor for correcting the first position if the second contact is not sensed, is smaller than a second correction quantity, which is used by the processor for correcting the first position if the second contact is sensed.

4. The apparatus of claim 1, wherein
the drawing module is configured to display a figure formed of a plurality of lines on a display screen of the display, and
the processor is configured to correct the first position if the first contact is sensed on the figure displayed on the display.

5. The apparatus of claim 1, wherein
the display comprises a first sensor and a second sensor,
the first contact is sensed by the first sensor, and
the second contact is sensed by the second sensor.

6. The apparatus of claim 5, wherein
the second sensor is capable of sensing both the first contact and the second contact, and
the processor is configured to correct the first position by using the first position of the first contact sensed by the first sensor and the second position of the second contact sensed by the second sensor.

7. A drawing method of an electronic apparatus connectable to a display capable of detecting a position of a first contact and a position of a second contact, an area of the first contact being smaller than a first threshold value, an area of the second contact being larger than a second threshold value, and the second threshold value being larger than the first threshold value, the method comprising:
correcting a first position of the first contact and generating a second position of the first contact, information of the first position of the first contact input via the display; and
drawing a locus of a second position of the first contact on the display,
wherein the correcting comprises correcting the first position of the first contact, by using at least one of whether the position of the second contact is detected or not, and a positional relationship between the first contact and the second contact.

8. A computer-readable, non-transitory storage medium configured to store a computer program which is executable by a computer connectable to a display capable of detecting a position of a first contact and a second contact, an area of the first contact being smaller than a first threshold value, an area of the second contact being larger than a second threshold value, and the second threshold value being lamer than the first threshold value, the computer program controlling the computer to execute functions of:
correcting a first position of the first contact;
generating a second position of the first contact, information of the first position of the first contact input via the display; and
drawing a locus of a second position of the first contact on the display,
wherein the correcting comprises correcting the first position of the first contact, by using at least one of whether the position of the second contact is detected or not, and a positional relationship between the first contact and the second contact.

9. The method of claim 7, wherein the correcting comprises determining a correction quantity of the first position, by using a distance between the first position and the second position.

10. The method of claim 7, wherein a first correction quantity which is used for correcting the first position if the second contact is not sensed, is smaller than a second correction quantity which is used for correcting the first position if the second contact is sensed.

11. The method of claim 7, wherein
the drawing comprises displaying a figure formed of a plurality of lines on a display screen of the display, and
the correcting comprises correcting the first position if the first contact is sensed on the figure displayed on the display.

12. The method of claim 7, wherein
the display comprises a first sensor and a second sensor,
the first contact is sensed by the first sensor, and
the second contact is sensed by the second sensor.

13. The method of claim 12, wherein
the second sensor is capable of sensing both the first contact and the second contact, and
the correcting comprises correcting the first position by using the first position sensed by the first sensor and the second position of the second contact sensed by the second sensor.

14. The medium of claim 8, wherein the correcting comprises determining a correction quantity of the first position is sensed, by using a distance between the first position and the second position.

15. The medium of claim 8, wherein a first correction quantity which is used for correcting the first position if the second contact is not sensed, is smaller than a second correction quantity which is used for correcting the first position if the second contact is sensed.

16. The medium of claim 8, wherein
the drawing comprises displaying a figure formed of a plurality of lines on a display screen of the display, and
the correcting comprises correcting the first position if the first contact is sensed on the figure displayed on the display.

17. The medium of claim 8, wherein
the display comprises a first sensor and a second sensor,
the first contact is sensed by the first sensor, and
the second contact is sensed by the second sensor.

18. The medium of claim 17, wherein
the second sensor is capable of sensing both the first contact and the second contact, and
the correcting comprises correcting the first position by using the first position of the first contact sensed by the first sensor and the second position of the second contact sensed by the second sensor.

* * * * *